United States Patent
Fuchimoto (10) Patent No.: US 9,232,104 B2
(45) Date of Patent: Jan. 5, 2016

(54) IMAGE PROCESSING DEVICE CAPABLE OF EXECUTING A PLURALITY OF FUNCTIONS

(71) Applicant: KYOCERA DOCUMENT SOLUTIONS INC., Osaka (JP)

(72) Inventor: Nobuyuki Fuchimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/871,664

(22) Filed: Apr. 26, 2013

(65) Prior Publication Data

US 2013/0286423 A1    Oct. 31, 2013

(30) Foreign Application Priority Data

Apr. 27, 2012   (JP) ................................ 2012-102269

(51) Int. Cl.
*G06F 3/12* (2006.01)
*H04N 1/00* (2006.01)

(52) U.S. Cl.
CPC ....... *H04N 1/00925* (2013.01); *H04N 1/00896* (2013.01); *H04N 2201/0094* (2013.01)

(58) Field of Classification Search
CPC .......... H04N 1/00925; H04N 1/00896; H04N 2201/0094
USPC ............................................... 358/1.13–1.18
See application file for complete search history.

(56) References Cited

U.S. PATENT DOCUMENTS

| 8,625,119 B2 | 1/2014 | Tsujimoto | |
| 2004/0233482 A1* | 11/2004 | Kuan et al. | 358/474 |
| 2012/0013931 A1* | 1/2012 | Tsujimoto | 358/1.13 |
| 2012/0075659 A1* | 3/2012 | Sawada et al. | 358/1.14 |

FOREIGN PATENT DOCUMENTS

| CN | 102340614 A | 2/2012 |
| JP | 06-122206 A | 5/1994 |
| JP | 2005-297264 A | 10/2005 |
| JP | 2006-184715 A | 7/2006 |
| JP | 2008-070609 A | 3/2008 |
| JP | 2011-037109 A | 2/2011 |

OTHER PUBLICATIONS

The First Office Action issued by the Chinese Patent Office on Jun. 6, 2015, which corresponds to Chinese Patent Application No. 201310146560.3 and is related to U.S. Appl. No. 13/871,664.

* cited by examiner

*Primary Examiner* — Marivelisse Santiago Cordero
*Assistant Examiner* — Kevin Ky
(74) *Attorney, Agent, or Firm* — Studebaker & Brackett PC (57) ABSTRACT

An image processing device is capable of executing a plurality of functions. The image processing device includes a preliminary operation execution section, a determination section, and an operation control section. The operation control section allows, where a determination result by the determination section is that preliminary operation is executable, the preliminary operation execution section to execute the preliminary operation when an instruction not being specified to be followed by execution of the main operation is input, and inhibits, where a determination result by the determination section is that preliminary operation is non-executable, the preliminary operation execution section from executing the preliminary operation when an instruction having a possibility of not being followed by execution of the main operation is input.

13 Claims, 4 Drawing Sheets

IMAGE PROCESSING DEVICE CAPABLE OF EXECUTING A PLURALITY OF FUNCTIONS

INCORPORATION BY REFERENCE

The present application claims priority under 35 U.S.C. §119 to Japanese Patent Application No. 2012-102269, filed Apr. 27, 2012. The contents of this application are incorporated herein by reference in their entirety.

BACKGROUND

Unless otherwise indicated herein, the description in this section is not prior art to the claims in this application and is not admitted to be prior art by inclusion in this section.

The present disclosure relates to image processing devices having a plurality of functions.

Recently, multifunction peripherals (MFP) having a plurality of functions are used in offices and the like. A multifunction peripheral is usually used in a state connected to an information processing terminal, such as a personal computer through a network, such as a local area network (LAN). The multifunction peripheral may function as: a printer to print image data input from the information processing terminal onto paper; a facsimile machine to facsimile image data input from the information processing terminal; an image reading device to obtain image data used in the information processing terminal; and a document management system to accumulate document image data so as to be searchable.

Further, in order to relieve environmental burden in the multifunction peripheral, a function is widely employed to switch, in non-use state and the like, a power supply mode to a low power consumption mode (sleep mode) in which power consumption of the multifunction peripheral is reduced. In order to recover the power supply mode from the low power consumption mode to a normal mode so that any one of the functions of the multifunction peripheral is executable, every unit that achieves its function is allowed to execute preliminary operation during the recovery. After completion of the preliminary operation, the multifunction peripheral can immediately execute any function that the user specifies. Various techniques have been proposed for recovery of the power supply mode from the low power consumption mode to the normal mode. Further, the techniques relating to the recovery may be employed in start-up operation at power-up in some cases.

Some image forming device executes preliminary operation only on a configuration (unit) relating to a function that the user selects or a function to which a job is input at power-up or in recovery from the lower power consumption mode to the normal mode. This technique may reduce the standby time for image output and power capacity and achieve power saving of the image forming device as a whole.

Some ink jet recording device has a configuration in which elapsed time from power-off to power on of the power source is measured, and the content of preliminary operation on an inkjet recording head is simplified when the elapsed time is equal to or shorter than a predetermined time period. With this technique, ink can be prevented from being wasted, and the startup time may be shortened.

Another image forming device compares information of a memory of a cartridge with information of a main body in recovery from the low power consumption mode to the normal mode. The cartridge supplies ink or toner to the main body. The memory of the cartridge stores information of the main body in transition to the low power consumption mode. This image forming device determines whether the cartridge is replaced in the low power consumption mode according to whether the information agreed with each other. Unless the cartridge is replaced, a photoreceptor is not initialized. With this configuration, time required for the recovery may be reduced.

Still another image forming device includes a signal line in addition to a bus interface between an engine for image formation and a controller. This signal line notifies that a predetermined time period elapses after a specific event occurs. With this technique, a recovery instruction can be input to the engine for image formation through the signal line before the bus interface is opened in recovery, thereby reducing the recovery time.

Yet another image forming device simplifies initialization operation (preliminary operation) in recovery from auto power-off more than initialization operation executed at any other timing (power-up and the like). In this image forming device, during the simplified initialization operation, home position seeking of a carriage is not performed, and the position information (count value) memorized in a memory at auto power-off is directly used, thereby reducing the recovery time.

Some of the aforementioned image forming devices may effectively function if a specific function to be used is specified at the time of recovery. However, for example, when the user pushes the power button provided on an operation panel of the image forming device for recovery from the low power consumption mode, no specific function is specified at the recovery. In this case, the image forming device is required to execute the preliminary operation on all functions so that every function can be immediately executed.

For example, even when the user who wants to use a scan function of the multifunction peripheral pushes the power button of the multifunction peripheral in the low power consumption mode for recovery, the multifunction peripheral executes the preliminary operation on sections besides an image reading section, such as an image forming section (a photoreceptor, a developing unit, a fuser, etc.). Further, where the user frequently uses the scan function but hardly uses a printing function, the preliminary operation on the image forming section, which is hardly used, is executed repeatedly.

Incidentally, execution of the preliminary operation on each unit to set respective functions of the multifunction peripheral to be in an executable state may not be preferable where the preliminary operation is not followed by main operation of a target function. For example, in a multifunction peripheral with the aforementioned inkjet recording device, the preliminary operation wastes ink, which means that repetition of the preliminary operation not followed by the main operation results in waste of the ink.

Further, even in a multifunction peripheral that performs image formation using toner, the preliminary operation may degrade image-formation quality and invite unnecessary ware-out of components that compose the image formation section, such as the photosensitive drum, the fuser, etc. For example, when only the preliminary operation on the image forming section is executed without execution of image formation followed, the toner, which is conveyed to a developing roller that allows the toner to adhere to an image carrier, is retained without adhering to the image carrier in the developing unit. The retained toner will not be stirred and not be replaced by fresh toner in the developing unit. For this reason, every time the developing roller is rotated in the preliminary operation, the quality of the toner may degrade by degradation of electrostatic charging and the like. This may result in degradation of image-formation quality in image formation using the toner. In order to avoid degradation of image-formation quality, refreshing operation may be performed by which the toner in the vicinity of an exit port is ejected forcedly. However, the refreshing operation wastes the toner. Further, no image can be formed during the refreshing operation, thereby requiring much time for image formation.

SUMMARY

An image processing device according to one aspect of the present disclosure is an image processing device capable of executing a plurality of functions. The image processing device includes a preliminary operation execution section, a determination section, and an operation control section. The preliminary operation execution section is configured to allow a unit which achieves one function of the plurality of functions to execute preliminary operation for execution of main operation, which is execution of the one function, independently of the main operation before the main operation. The determination section configured to determine whether to allow the preliminary operation execution section to execute the preliminary operation on the basis of a degree of execution of the preliminary operation not followed by execution of the main operation. The operation control section is configured to allow, where a determination result by the determination section is that the preliminary operation is executable, the preliminary operation execution section to execute the preliminary operation when an instruction not being specified to be followed by execution of the main operation is input, and configured to inhibit, where a determination result by the determination section is that preliminary operation is non-executable, the preliminary operation execution section from executing the preliminary operation when an instruction having a possibility of not being followed by execution of the main operation is input.

DETAILED DESCRIPTION

An Embodiment of the present disclosure will be described below in detail with reference to the accompanying drawings. A digital multifunction peripheral will be referred to as one example of the present disclosure. A digital multifunction peripheral in the present embodiment is configured to be capable of executing a plurality of functions including an image reading function, an image formation function (copy function and printing function), a facsimile function, and a network sending/receiving function. As will be described below, each function of the digital multifunction peripheral according to the present embodiment is achieved by one or more of an image reading section, an image forming section, a facsimile adapter, and a network adapter. The image reading section, the image forming section, the facsimile adapter, and the network adapter are each composed as one or more units capable of independently receiving power supply.

Further, the digital multifunction peripheral is configured to be switchable among a plurality of power supply modes including a standby mode and a low power consumption mode (sleep mode). The standby mode is a mode in which electric power is supplied to one or more units to set at least one of the functions to be in an executable state. The low power consumption mode is a mode in which minimum electric power required for reception of an external instruction and the like is supplied to reduce power consumption.

Figure 1:
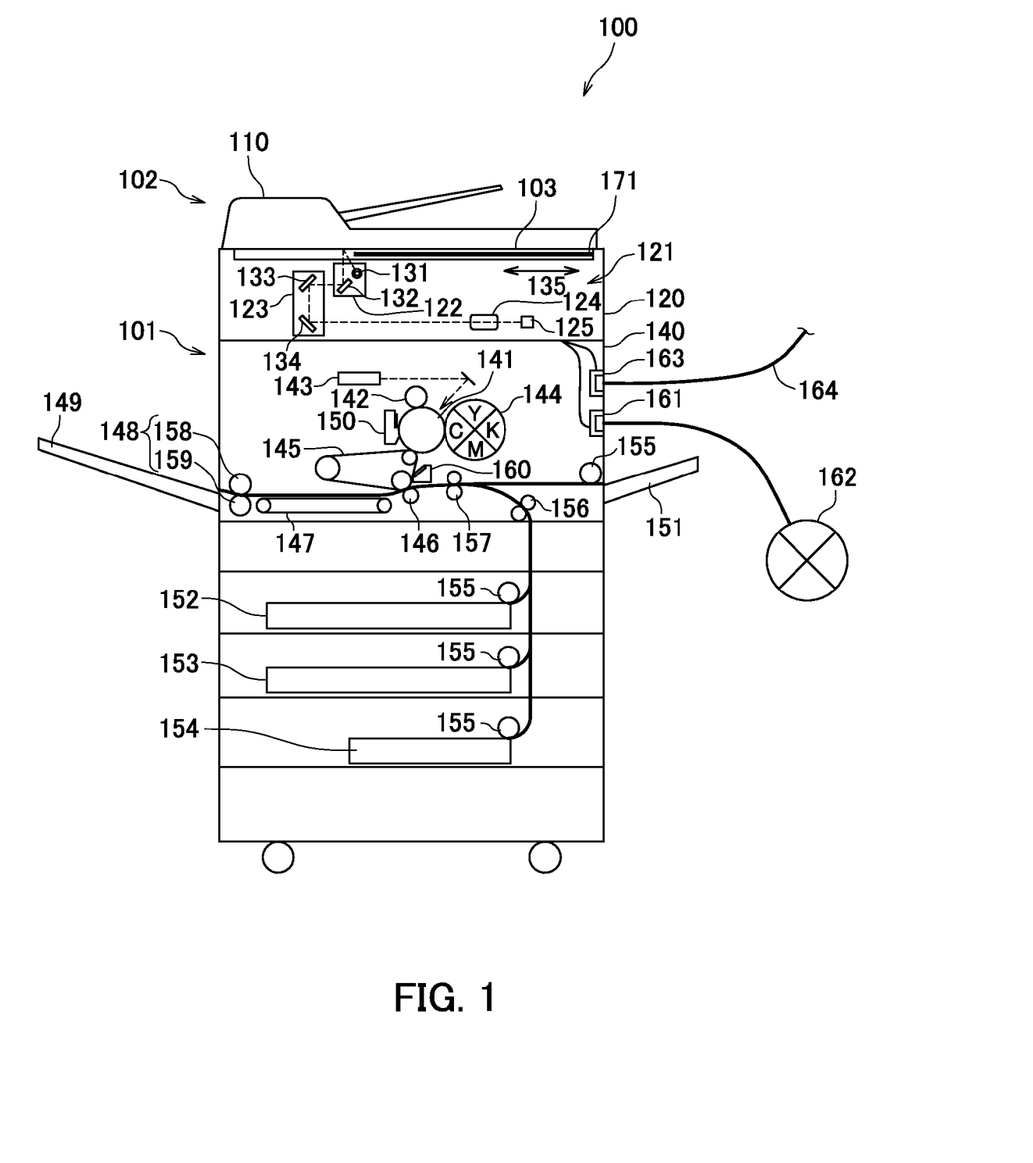
FIG. 1 is a schematic configuration diagram showing an overall configuration of a multifunction peripheral according to one embodiment of the present disclosure.

FIG. 1 is a schematic configuration diagram showing one example of an overall configuration of a digital multifunction peripheral 100 (hereinafter referred to as a multifunction peripheral 100) according to the present embodiment. As shown in FIG. 1, the multifunction peripheral 100 includes a main body 101 including an image reading section 120 and an image forming section 140 and a platen cover 102 mounted on the main body 101. On the upper surface of the main body 101, a platen 103 is provided so that the platen cover 102 opens/closes the platen 103. Further, the platen cover 102 includes a document feeder 110. It is noted that an operation panel 171 is provided on the front surface of the multifunction peripheral 100. Through the operation panel 171, the user can provide an instruction for copy start or any other instruction to the multifunction peripheral 100, or confirm the state or setting of the multifunction peripheral 100.

The image reading section 120 is provided below the platen 103. The image reading section 120 is configured to read an image of an original document by using a scan optical system 121 to generate digital data (image data) of the image. The original document may be placed on the platen 103 or the document feeder 110. The scan optical system 121 includes a first carriage 122, a second carriage 123, and a condensing lens 124. A linear light source 131 and a mirror 132 are provided in the first carriage 122. Mirrors 133, 134 are provided in the second carriage 123. The light source 131 lights an original document. The mirrors 132, 133, 134 guide reflected light from the original document to the condensing lens 124. The condensing lens 124 images the light on a light receiving surface of a line image sensor 125.

The first carriage 122 and the second carriage 123 of the scan optical system 121 are provided so as to be capable of reciprocating in the sub scanning direction 135. Moving the first carriage 122 and the second carriage 123 in the sub scanning direction 135 can allow the image sensor 125 to read the image of the original document placed on the platen 103. In order to read the image of the original document set on the document feeder 110, the image reading section 120 temporarily fixes the first carriage 122 and the second carriage 123 in alignment with an image reading position and allows the image sensor 125 to read the image of the original document passing over the image reading position. The image sensor 125 generates image data of the original document corresponding to, for example, respective colors of R (red), G (green), and B (blue) according to light made incident on the light receiving surface.

The generated image data can be printed on paper in the image forming section 140. Alternatively, it can be sent to other equipment (not shown) by the network adapter 161 through a network 162. Or, it can be facsimiled by the facsimile adapter 163 through a public communication line 164.

The image forming section 140 prints on the paper, for example, image data obtained in the image reading section 120, image data received in the network adapter 161 from other equipment connected to the network 162, or image data received in the facsimile adapter 163 through the public communication line 164.

The image forming section 140 includes a photosensitive drum 141. The photosensitive drum 141 rotates in one direction at a given speed. Around the photosensitive drum 141, there are arranged a charger 142, an exposure unit 143, a developing unit 144, an intermediate transfer belt 145, and a cleaner 150 in this order from the upstream side in the direction of rotation. The charger 142 electrostatically charges the surface of the photosensitive drum 141 uniformly. The exposure unit 143 irradiates light to the uniformly charged surface of the photosensitive drum 141 according to the image data to form an electrostatic latent image on the photosensitive drum 141. The developing unit 144 allows toner to adhere to the electrostatic latent image to form a toner image on the photosensitive drum 141. The intermediate transfer belt 145 transfers the toner image formed on the photosensitive drum 141 to paper. The cleaner 150 removes extraneous matter, such as toner remaining on the photosensitive drum 14 after transfer by using a cleaning blade.

In the case where the image data is data of a color image, the intermediate transfer belt 145 transfers toner images of respective colors on identical paper. An intermediate transfer belt cleaner 160 is provided at the intermediate transfer belt 145. The intermediate transfer belt cleaner 160 removes extraneous matter, such as toner remaining on the intermediate transfer belt 145 after transfer. It is noted that a color image in RGB format is converted to image data in cyan-magenta-yellow-black (CMYK) format. Then, the image data in the respective colors are input to the exposure unit 143.

The image forming section 140 feeds paper from any of a manual feed tray 151, paper feed cassettes 152, 153, 154, etc. to a transfer section between the intermediate transfer belt 145 and the transfer roller 146. Paper in various size can be placed on the manual feed tray 151 and accommodated in each paper feed cassette 152, 153, 154. The image forming section 140 selects paper of which size is specified by the user or paper in the size corresponding to auto-detected size of an original document, and feeds the paper in the selected size from the manual feed tray 151 or any of the cassettes 152, 153, 154 through a paper feed roller 155. A conveyance roller 156 and a registration roller 157 convey the fed paper to the transfer section.

A conveyance belt 147 conveys paper, to which a toner image is transferred, to a fuser 148. The fuser 148 includes a fusing roller 158 in which a heater is built and a pressure roller 159 to fuse the toner image to the paper by heat and pressing force. The image forming section 140 ejects the paper having passed through the fuser 148 onto an exit tray 149.

Figure 2:
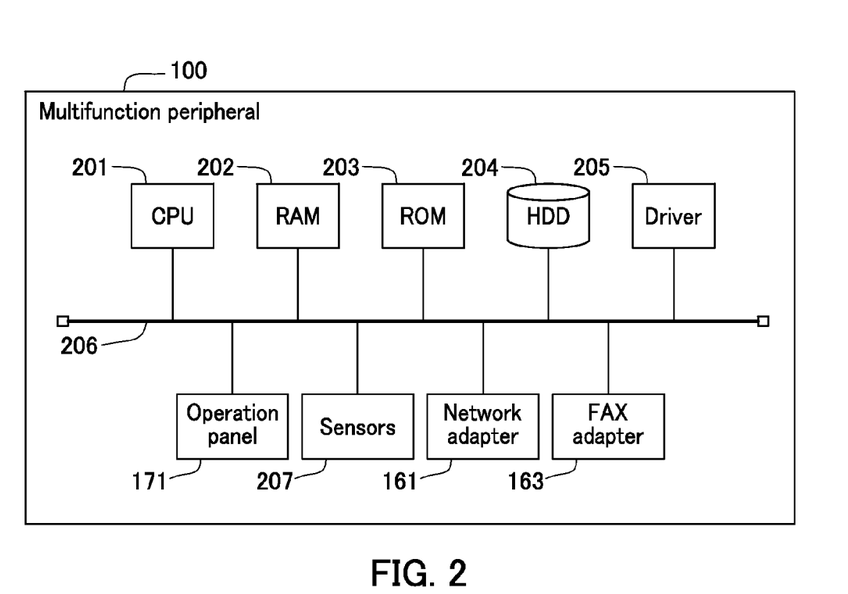
FIG. 2 is a diagram showing a hardware configuration of the multifunction peripheral according to one embodiment of the present disclosure.

FIG. 2 is a diagram showing a hardware configuration of a control system in the multifunction peripheral 100 according to one embodiment of the present disclosure. In the multifunction peripheral 100 according to the present embodiment, a central processing unit (CPU) 201, a random access memory (RAM) 203, a read only memory (ROM) 203, a hard disk drive (HDD) 204, and a driver 205 corresponding to respective drive sections included in the document feeder 110, the image reading section 120, and the image forming section 140 are connected together through an internal bus 206. The ROM 203, the HDD 204, etc. store programs. The CPU 201 controls the multifunction peripheral 100 according to instructions of their control programs. For example, the CPU 201 utilizes the RAM 202 as a work area for sending/receiving data and instructions to/from the driver 205 to control operation of the respective drive sections. Further, the HDD 204 is used to accumulate image data obtained from the image reading section 120, image data received from other equipment through the network adapter 161, and image data received through the facsimile adapter 163.

The internal bus 206 is connected also to the operation panel 171 and various sensors 207. The operation panel 171 receives user's operation to supply a signal based on the operation to the CPU 201. Further, the operation panel 171 allows a display device that the operation panel 171 includes to display an operation screen according to control signals from the CPU 201. The sensors 207 include an open/close sensor for the platen cover 102, an original document sensor on the platen 103, a temperature sensor for the fuser 148, sensors that detect an original document or conveyed paper, etc. The CPU 201 executes a program stored in, for example, the ROM 203 to achieve respective functions (function blocks), which will be described below, and controls operation of the respective functions according to signals from the corresponding sensors.

Figure 3:
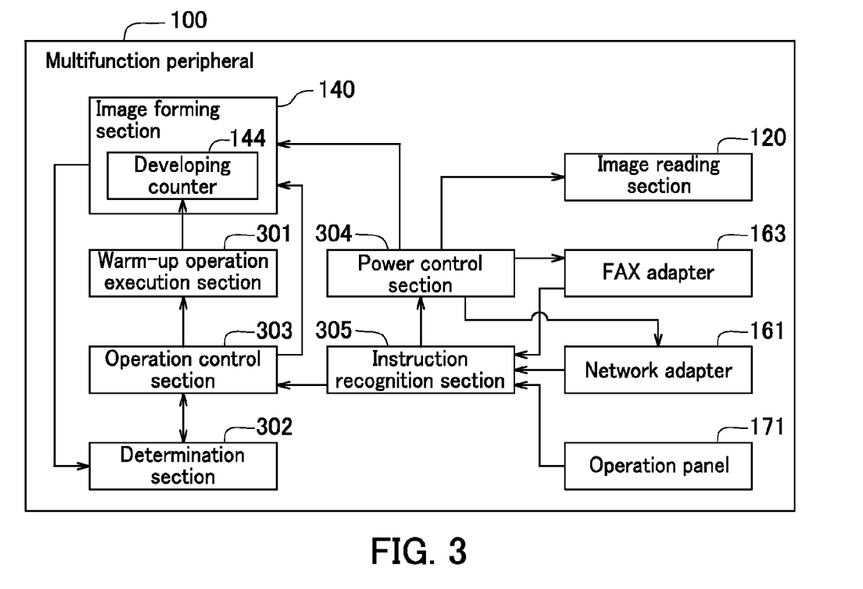
FIG. 3 is a functional block diagram showing the multifunction peripheral according to one embodiment of the present disclosure.

FIG. 3 is a functional block diagram of the multifunction peripheral 100 according to one embodiment of the present disclosure. As shown in FIG. 3, the multifunction peripheral 100 of the present embodiment includes a preliminary operation execution section 301, a determination section 302, and an operation control section 303. The multifunction peripheral 100 also includes a power control section 304 and an instruction recognition section 305.

The instruction recognition section 305 recognizes the content of an instruction input to the multifunction peripheral 100. Examples of the instruction input to the multifunction peripheral 100 may include an instruction that the user inputs through the operation panel 171, an instruction input through the network adapter 161 from other equipment, such as an information processing terminal and the like, and an instruction input through the facsimile adapter 163 from the public communication line 164.

The power control section 304 switches a plurality of power supply modes including the aforementioned standby and low power consumption modes. Transition from the standby mode to the low power consumption mode and transition from the low power consumption mode to the standby mode are executed when respective conditions registered in advance are satisfied. For example, "continuation of the state where no instruction is input to the multifunction peripheral 100 for a predetermined time period" may be employed as a condition for the transition from the standby mode to the low power consumption mode. Further, "input of an instruction to the multifunction peripheral 100" may be employed as a condition for the transition from the low power consumption mode to the standby mode. Input of such an instruction is recognized by the instruction recognition section 305.

The standby mode includes a mode in which only one of the functions (an image reading function, an image formation function, a facsimile function, and a network sending/receiving function) that the multifunction peripheral 100 can be execute is ready to be immediately executed, as well as a mode in which some of the plural functions are ready to be immediately executed and a mode in which all the functions are ready to be immediately executed. Further, in the low power consumption mode, the power is supplied to only part of the multifunction peripheral 100 so as to maintain the multifunction peripheral 100 in a state in which whether a condition for transition from the low power consumption mode to another power supply mode (e.g., any mode included in the standby mode) is satisfied can be detected. For example, power supply may be stopped to sensors irrelevant to detection as to whether a condition for recovery is satisfied (e.g., the platen cover open/close sensor, the original document sensor, etc.), the RAM 202, the HDD 204, the respective units (the image reading section 120 and the image forming section 140), etc. Furthermore, only minimum power required for the above detection is supplied to the CPU 201.

Examples of instructions that the instruction recognition section 305 recognizes include instructions by which a specific function is specified and instructions by which no specific function is specified. Examples of the instructions by which a specific function is specified include instructions input by pushing specific ones of operation buttons on the operation panel 171 corresponding to respective functions (the image reading function, the image formation function, the facsimile function, the network sending/receiving function) that the multifunction peripheral 100 can execute, image reading instructions, facsimile instructions, printing instructions, etc. input from an information processing terminal through the network adapter 161, and facsimile receiving instructions incoming from the public communication line 164 to the facsimile adapter 163. By contrast, examples of the instructions by which no specific function is specified include instructions input by pushing ones of specific operation buttons (the power button, etc.) on the operation panel 171 other than the specific operation buttons corresponding to the respective functions that the multifunction peripheral 100 can execute.

Upon recognition of an instruction by which a specific function is specified, the instruction recognition section 305 notifies the power control section 304 of it. The power control section 304 that receives the notification is moved to a mode in which power is supplied to a unit that achieves the specified function rather than a mode in which power is supplied to the entire multifunction peripheral 100. For example, where the notified instruction is an image data reading instruction received through the network adapter 161, the power control section 304 supplies the power to only a unit necessary for performing the image reading function. Alternatively, where the notified instruction is a facsimile receiving instruction received through the facsimile adapter 163, it supplies the power only to a unit necessary for performing the facsimile receiving function. By contrast, upon recognition of an instruction by which no specific function is specified, the instruction recognition section 30 notifies the power control section 304 of it. The notified power control section 304 is moved to a mode in which the power is supplied to the entire multifunction peripheral 100.

Ahead of main operation, which is execution of one function, the preliminary operation execution section 301 allows a unit that achieves the one function to execute preliminary operation for execution of the main operation independently of the main operation. Suppose herein that: the main operation is formation of a toner image obtained by developing an electrostatic latent image on the peripheral surface of the photosensitive drum 141 with toner by the developing unit 144; and the preliminary operation is preliminary operation on the developing unit 144 for formation of the toner image. Specifically, examples of the preliminary operation are rotation of a developing roller, which is opposed to the photosensitive drum 141 and allows the retained toner to adhere to the photosensitive drum 141, and rotation of a stirring roller to stir the toner in the developing unit 144. Each rotation is rotation not followed by image formation. In this case, the one function (hereinafter appropriately referred to as a management target function) is the image formation function, and the developing unit 144 is a management target unit.

In this configuration, if the preliminary operation on the developing unit 144, which is not followed by formation of a toner image onto the photosensitive drum 141 as the main operation, is executed repeatedly, the toner conveyed to the developing roller of the developing unit 144 is kept retained on the developing roller. In this state, the toner will not be replaced by new toner in the developing unit 144. As such, every time the developing roller is rotated as the preliminary operation, the quality of the toner may be degraded by degradation of electrostatic charging. When an image is formed with the degraded toner, degradation of image-formation quality can be caused.

The determination section 302 determines whether to allow the preliminary operation execution section 301 to execute the preliminary operation on the developing unit 144 on the basis of the degree of execution of the preliminary operation on developing unit 144 not followed by execution of the main operation. The determination section 302 in the present embodiment obtains from the image forming section 140 the total number of execution times of the preliminary operation on the developing unit 144 not followed by formation of a toner image onto the photosensitive drum 141. Then, the determination section 302 determines that the preliminary operation is non-executable when the total number of execution times exceeds a predetermined threshold value and determines that the preliminary operation is executable when the total number of execution times is equal to or smaller than the predetermined threshold value. For example, an experiment or the like may be performed to obtain the total number of execution times, up to which degradation of image-formation quality may be caused where the preliminary operation on the developing unit 144 not followed by formation of a toner image onto the photosensitive drum 141 is repeated. Then, the threshold value is set in advance according to the obtained total number of execution times.

It is noted that as the threshold value herein, a value is set at the total number of execution times when image-formation quality may degrade if the preliminary operation on the developing unit 144 not followed by formation of a toner image onto the photosensitive drum 141 is executed next, and then, the preliminary operation and the toner image formation are executed. In other words, the threshold value is set at the number of execution times when image-formation quality may degrade in the subsequent main operation after one-more-time execution of the preliminary operation on the developing unit 144 not followed by formation of a toner image onto the photosensitive drum 141.

The operation control section 303 changes the executability of the preliminary operation on the basis of a determination result by the determination section 302. Specifically, where the determination result by the determination section 302 is that the preliminary operation is executable, the operation control section 303 allows the preliminary operation execution section 301 to execute the preliminary operation on the developing unit 144 when an instruction having a possibility of being followed by execution of the main operation for formation of a toner image onto the photosensitive drum 141 (an instruction not being specified to be followed by execution of the main operation) is input to the multifunction peripheral 100. By contrast, where the determination result by the determination section 302 is that the preliminary operation is non-executable, the operation control section 303 inhibits the preliminary operation execution section 301 from executing the preliminary operation on the developing unit 144 when an instruction having a possibility of not being followed by execution of the main operation for formation of a toner image onto the photosensitive drum 141 is input to the multifunction peripheral 100. In this case, when an instruction to execute the main operation, that is, an instruction to execute the image formation function is input to the multifunction peripheral 100, the preliminary operation execution section 301 is allowed to execute the preliminary operation on the developing unit 144.

It is noted that the operation control section 303 in the present embodiment manages operation relating to the image forming section 140. Although operation control sections that manage corresponding operation are provided in the other units, such as the image reading section 120, they are not omitted in FIG. 3.

Description will be made next about transition from the low power consumption mode to the standby mode that the multifunction peripheral 100 performs. In the following description, transition when an instruction by which no specific function is specified is input will be discussed first. Then, transition when an instruction by which a specific function is specified is input will be discussed.

Figure 4:
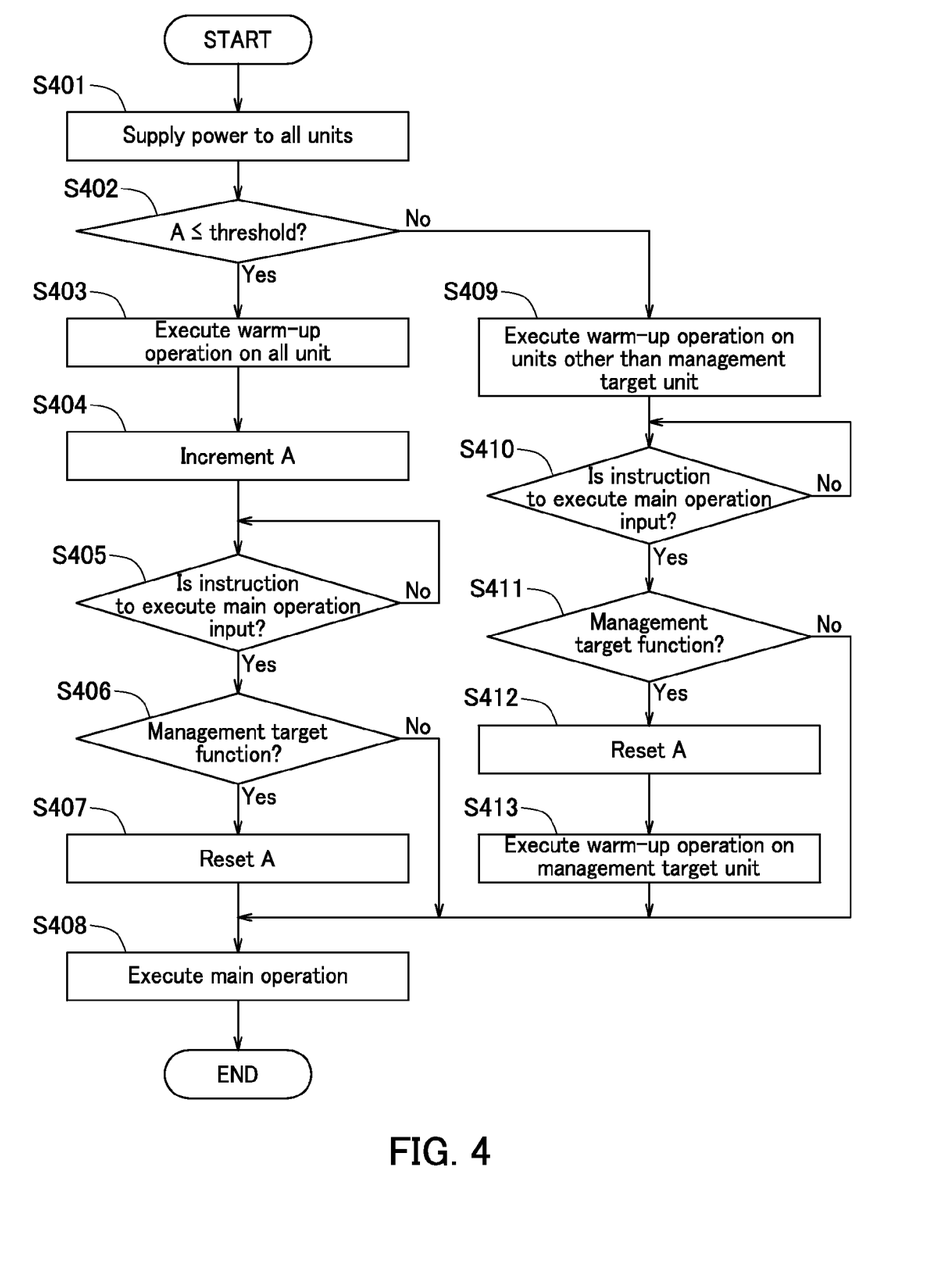
FIG. 4 is a flowchart depicting one example of a sequence of transition from a low power consumption mode to a standby mode that the multifunction peripheral performs according to one embodiment of the present disclosure.

FIG. 4 is a flowchart depicting one example of a sequence of transition from the low power consumption mode to the standby mode that the multifunction peripheral 100 performs according to one embodiment of the present disclosure. This sequence starts at recognition by the instruction recognition section 305 of input of an instruction by which no specific function is specified, as a trigger. In this case, which function the user will use cannot be specified at the time when the instruction is input. Accordingly, the multifunction peripheral 100 is switched to a standby mode in which all the functions are ready to be used. It is noted that while the sequence of transition from the low power consumption mode to the standby mode is discussed herein, the state where which function the user will use cannot be specified may occur when the main power source of the multifunction peripheral 100 is turned on from off (when power supply to the multifunction peripheral 10 from the outside starts), etc. Accordingly, the following sequence can be applied to a sequence for turning the main power source of the multifunction peripheral 100 on from off.

With reference to FIGS. 3 and 4, description will be made below about one example of a sequence of transition from the low power consumption mode to the standby mode that the multifunction peripheral 100 performs according to one embodiment of the present disclosure. As described above, when the instruction recognition section 305 recognizes input of an instruction by which no specific function is specified, the power control section 304 supplies power to all the units in response to the notification from the instruction recognition section 305 (step S401). At this time, the instruction recognition section 305 notifies also the operation control section 303 of the input of the instruction by which no specific function is specified. The operation control section 303, which receives the notification, makes a query to the determination section 302 as to whether the preliminary operation on the developing unit 144 is to execute.

At this time, the determination section 302 determines whether the total number A of execution times of the preliminary operation on the developing unit 144, which the image forming section 140 holds, exceeds the predetermined threshold value (step S402). Suppose herein that the threshold value is set at "five", and the total number A of execution times is "five". In this case, since the total number A of execution times is equal to or smaller than the threshold value, the determination section 302 determines that the preliminary operation is executable and notifies the operation control section 303 of the determination result (Yes in step S402).

Upon receipt of the notification that the preliminary operation is executable, the operation control section 303 allows the preliminary operation execution section 301 to execute the preliminary operation on the developing unit 144 (step S403). It is noted that in the present embodiment, only the developing unit 144 of the image forming section 140 to achieve the image formation function is set as a management target unit, and the other units are not set as management targets. Accordingly, the preliminary operation is executed on all the units including the developing unit 144 at the step S403 in the present embodiment.

Further, in the present embodiment, when the preliminary operation execution section 301 executes the preliminary operation on the developing unit 144, the determination section 302 increments the value of the total number A of execution times (step S404). As described above, the total number A of execution times herein is "five". Accordingly, the total number A of execution times after increment becomes "six". At the time when the preliminary operation execution section 301 executes the preliminary operation on the developing unit 144, it is not fixed whether the preliminary operation on the developing unit 144 executed at this time is the preliminary operation that is not followed by the main operation. However, as will be described later, where the preliminary operation is followed by the main operation, the total number A of execution times is reset to be A=0. Therefore, increment of the total number A of execution times at this time point may not cause inconvenience.

During the above sequence, the multifunction peripheral 100 only receives the instruction by which no specific function is specified and does not yet receive any instruction to execute a specific function. Accordingly, the multifunction peripheral 100 stands by until an instruction to execute a specific function (an instruction to execute the main operation) is input (No in step S405). When an instruction to execute the image formation function (e.g., a copying instruction) as a management target function is input, the instruction recognition section 305 notifies the operation control section 303 of it (Yes in steps S405 and S406). Thus, the previous preliminary operation on the developing unit 144 is fixed as the preliminary operation followed by the main operation. The operation control section 303 that receives the notification accordingly allows the determination section 302 to reset the value of the total number A of execution times and allows the image forming section 140 to execute image formation according to the input instruction (steps S407 and S408).

Alternatively, when an instruction to execute a function other than the management target (e.g., an image reading instruction) is input in the step S405, the instruction recognition section 305 notifies the operation control section 303 of it (Yes in step S405 and No in step S406). Since the previous preliminary operation on the developing unit 144 is fixed as the preliminary operation not followed by the main operation, the operation control section 303 that receives the notification will not reset the value of the total number A of execution times that the determination section 302 holds. Further, at this time, the image reading section 120 executes image reading according to the input instruction (step S408).

By contrast, when the total number A of execution times is, for example, "six" in the step S402, which means that the total number A of execution times exceeds the threshold value, the determination section 302 determines that the preliminary operation is non-executable and notifies the operation control section 303 of the determination result (No in step S402).

Upon receipt of the notification that the preliminary operation is non-executable, the operation control section 303 inhibits the preliminary operation execution section 301 from executing the preliminary operation on the developing unit 144 (step S409). As described above, in the present embodiment, only the developing unit 144 is the management target unit, and the other units are not management targets. Accordingly, the preliminary operation is executed on each unit except the developing unit 144 in the step S409.

During the above sequence, the multifunction peripheral 100 receives only the instruction by which no specific function is specified and does not yet receive any instruction to execute a specific function. Accordingly, the multifunction peripheral 100 stands by until an instruction to execute a specific function is input (No in step S410). When an instruction to execute the image formation function (e.g., a copying instruction) as a management target function is input, the instruction recognition section 305 notifies the operation control section 303 of it (Yes in steps S410 and S411). Upon receipt of the notification, the operation control section 303 allows the preliminary operation execution section 301 to execute the preliminary operation on the developing unit 144 at this time, and then, allows the image forming section 140 to execute image formation according to the input instruction. Further, since the preliminary operation on the developing unit 144 executed at this time is followed by the main operation, the determination section 302 resets the value of the total number A of execution times (steps S412, S413, and S408).

Moreover, when an instruction to execute a function other than the management target function, for example, an image reading instruction is input in the step S410, the image reading section 120 executes image reading according to the input instruction (Yes in step S410, No in step S411, and step S408). It is noted that since the preliminary operation on the developing unit 144 is not executed in this case, the determination section 302 will not increment the value of the total number A of execution times.

As described above, in the present embodiment, where the determination result by the determination section 302 is that the preliminary operation is executable, the operation control section 303 allows the preliminary operation execution section 301 to execute the preliminary operation on the developing unit 144 when an instruction having a possibility of being followed by execution of the main operation for formation of a toner image onto the photosensitive drum 141 (an instruction by which no specific function is specified) is input to the multifunction peripheral 100. Alternatively, where the determination result by the determination section 302 is that the preliminary operation is non-executable, the operation control section 303 inhibits the preliminary operation execution section 301 from executing the preliminary operation on the developing unit 144, an instruction having a possibility of not being followed by formation of a toner image onto the photosensitive drum 141 (an instruction by which no specific function is specified) is input to the multifunction peripheral 100. In this case, when an instruction to execute image formation is input to the multifunction peripheral 100, the preliminary operation execution section 301 is allowed to execute the preliminary operation on the developing unit 144.

As described above, where the determination result by the determination section 302 is that the preliminary operation is executable, upon to the multifunction peripheral 100 of an instruction by which no specific function is specified is input, the operation control section 303 allows the preliminary operation to be executed on all the functions including the management target unit during transition to the standby mode according to the input instruction. By contrast, where the determination result by the determination section 302 is that the preliminary operation is non-executable, the preliminary operation on the management target unit is not executed during transition to the standby mode according to input of the instruction. Instead, after input of the instruction, the preliminary operation on the management target unit is executed when an instruction to execute the main operation of the management target unit is input.

It is noted that while the case of standing by until an instruction to execute a specific function is input in the steps S405 and S410 has been described above, an instruction to execute a specific function may be input to the multifunction peripheral 100 in parallel to steps before the steps S405 and S406. In this case, the sequence proceeds without waiting input in the steps S405 and S410.

Figure 5:
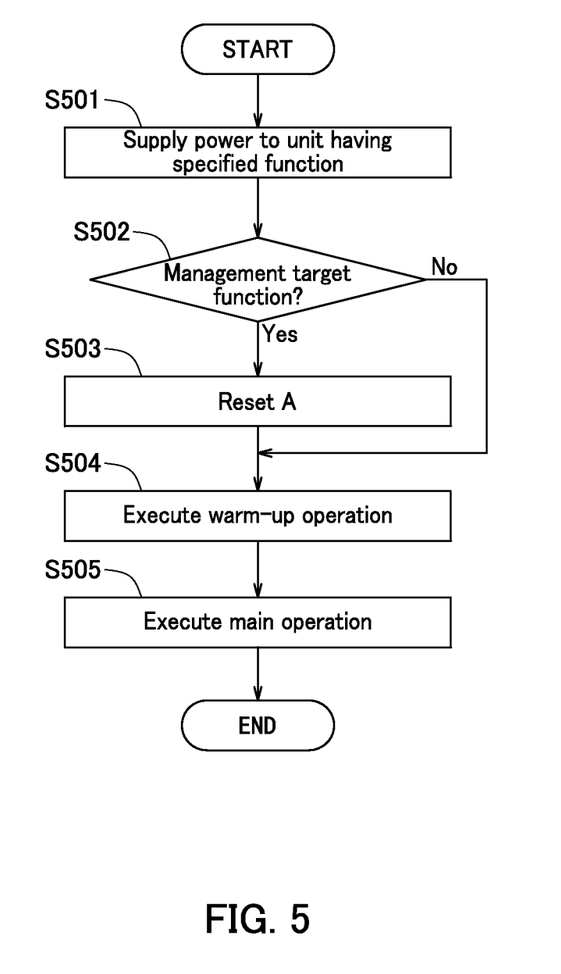
FIG. 5 is a flowchart depicting another example of a sequence of transition from the low power consumption mode to the standby mode that the multifunction peripheral performs according to one embodiment of the present disclosure.

Description will be made next about transition where an instruction by which a specific function is specified is input. FIG. 5 is a flowchart showing another example of a sequence of transition from the low power consumption mode to the standby mode that the multifunction peripheral 100 performs in one embodiment of the present disclosure. This sequence starts at recognition by the instruction recognition section 305 of input of an instruction by which a specific function is specified, as a trigger.

With reference to FIGS. 3 and 5, description will be made below about the other example of the sequence of transition from the low power consumption mode to the standby mode that the multifunction peripheral 100 performs in one embodiment of the present disclosure.

As described above, when the instruction recognition section 305 recognizes input of an instruction by which a specific function is specified, the power control section 304 supplies power to a unit that achieves the specified function in response to the notification from the instruction recognition section 305 (step S501).

Where the instruction input at this time is an instruction to execute image formation function (e.g., copying instruction) as a management target function, the instruction recognition section 305 notifies the operation control section 303 of it (Yes in step S502). Upon receipt of the notification, the operation control section 303 allows the preliminary operation execution section 301 to execute the preliminary operation on the developing unit 144, and then, allows the image forming section 140 to execute image formation according to the input instruction. Further, since the preliminary operation on the developing unit 144 executed at this time is followed by the main operation, the determination section 302 resets the value of the total number A of execution times (steps S503, S504, and S505).

Alternatively, where the input instruction is an instruction to execute a function other than the management target function, for example, an image reading instruction, the preliminary operation for image reading is executed on the image reading section 120. Then, image reading according to the input instruction is executed in the image reading section 120 (steps S504 and S505). It is noted that since the preliminary operation on the developing unit 144 is not executed in this case, the determination section 302 will not increment the value of the total number A of execution times.

As described above, when an instruction by which a specific function is specified is input to the multifunction peripheral 100, transition to the standby mode according to input of the instruction is performed regardless of the determination result by the determination section 302.

Thus, in the multifunction peripheral 100, the number of execution times of the preliminary operation on the developing unit 144 not followed by the main operation is limited to the value equal to or smaller than the value at which no degradation of image quality is caused. Accordingly, degradation of image quality, which may be caused due to repeated execution of the preliminary operation on the developing unit 144 not followed by the main operation, can be prevented. Further, under the state where no degradation of image quality is caused even when the preliminary operation on the developing unit 144 not followed by the main operation is executed, the preliminary operation is executed when an instruction having a possibility of being followed by execution of image formation is input. Accordingly, quick image formation can be achieved, and the user-friendliness can be maintained.

It is noted that while description has been made about the configuration in which the determination section 302 determines whether to execute the preliminary operation on the basis of the total number of execution times of the preliminary operation not followed by execution of the main operation, any other data may be used only where the data reflects the degree of execution of the preliminary operation not followed by the main operation. The determination section 302 may have a configuration to determine whether to execute the preliminary operation according to whether the total time period when a drive section driven in execution of the preliminary operation after previous execution of the main operation is driven exceeds a predetermined threshold value. For example, when the total time period when a drive section (the developing unit 144) driven in execution of the preliminary operation is driven after previous execution of the main operation exceeds a predetermined threshold value, the determination section 302 may determine that the preliminary operation is non-executable.

As described above, according to the present disclosure, the user-friendliness can be prevented from decreasing as far as possible. Further, a defect, which is caused due to execution of the preliminary operation not followed by the main operation, can be adequately prevented.

It is noted that the aforementioned embodiment is not intended to limit the technical scope of the present disclosure, and various modifications and applications other than the above examples are possible within the scope of the present disclosure. For example, while the above embodiment describes the case where the image carrier on which the developing unit forms a toner image is the photosensitive drum, the image carrier may be the intermediate transfer belt. Moreover, the management target unit is not limited to the developing unit and can be any unit in which defect may be caused due to execution of the preliminary operation thereon. For example, the photosensitive drum 141 or the intermediate transfer belt 145 may be the management target unit in the above mentioned multifunction peripheral 100. The preliminary operation may cause press contact of the cleaner 150 or a cleaning blade of the cleaner 160 in the state with no toner supply to increase frictional force. This can degrade the photosensitive drum 141 or the intermediate transfer belt 145. However, such a defect can be prevented in this case. Moreover, the number of the management targets may be plural.

Furthermore, the order of the steps in the flowcharts shown in FIGS. 4 and 5 can be changed appropriately within the scope that can carries out equivalent operation. For example, the total number A of execution times may be incremented and/or reset at any timing when the same operation can be carried out.

Still more, the configuration with the power control section 304 has been described in the above embodiment, but the power control section is inessential to the present disclosure. For example, the same effects can be produced even where the present disclosure is applied to multifunction peripherals and the like configured to execute preliminary operation on each unit every time a predetermined time period elapses.

In addition, while the digital multifunction peripheral having the scan function, the printing function, and the facsimile function is exemplified in the above embodiment of the present disclosure, the present disclosure is applicable to not only such digital multifunction peripherals but also any image processing devices having a plurality of functions.

The image processing device according to one embodiment of the present disclosure has been described with reference to FIGS. 1-5. According to the image processing device in the present disclosure, execution of the preliminary operation depends on the degree of execution of the preliminary operation not followed by execution of the main operation. That is, during the phase in which no defect is caused even when the preliminary operation is executed (the determination result by the determination section is that "the preliminary operation is executable"), the preliminary operation for the main operation is executed only when an instruction having a possibility of being followed by the main operation (an instruction not being specified to be followed by execution of the main operation) is input. By contrast, during the phase in which a defect may be caused in the main operation when the preliminary operation not followed by the main operation is executed, and the preliminary operation and the main operation are then executed (the determination result by the determination section is "the preliminary operation is non-executable"), execution of the preliminary operation is inhibited when an instruction having a possibility of not being followed by the main operation is input.

With the configuration of the image processing device according to the present disclosure, a defect, which may be caused due to repeated execution of the preliminary operation not followed by the main operation, can be prevented. Further, in the state where no defect is caused even when the preliminary operation is executed, the preliminary operation is executed when an instruction having a possibility of being followed by the main operation is input. Thus, quick execution of the main operation can be achieved. It is noted that the determination criterion as to whether the preliminary operation is to be executed or not in the determination section can be obtained in advance by an experiment or the like.

The image processing device according to the present disclosure can employ a configuration including the power control section configured to switch a plurality of power supply modes including the standby mode, in which at least one function is executable, and the low power consumption mode, in which power consumption is lower than that of the standby mode. With the configuration of the image processing device according to the present disclosure, the power control section switches the modes from the low power consumption mode to the standby mode according to the input instructions. Here, the "instruction having a possibility of being followed by execution of the main operation (the instruction not being specified to be followed by execution of the main operation)" and the "instruction having a possibility of not being followed by execution of the main operation" for a unit that achieves a specific one function are instructions by which no function to be executed is fixed at the time point when the instruction is input. Examples of such the instructions include an instruction by which no specific function is specified at input, such as pushing of the power button provided on the operation panel.

Accordingly, in the image processing device according to the present disclosure, when an instruction by which no specific function is specified is input, where the determination result by the determination section is that the preliminary operation is executable, the operation control section allows the preliminary operation to be executed on all the functions including a management target unit during transition to the standby mode according to input of the instruction. By contrast, where the determination result by the determination section is that the preliminary operation is non-executable, the preliminary operation on the management target unit is not executed during transition to the standby mode according to input of the instruction. After the instruction is input, the preliminary operation is executed only when an instruction to execute the main operation on the management target unit is input.

Suppose, for example, that: the image processing device includes an image carrier configured to carry a toner image that is to be transferred to a transfer target and a developing unit configured to form a toner image onto the image carrier; the main operation is formation of a toner image onto the image carrier by the developing unit; and the preliminary operation is the preliminary operation on the developing unit for formation of a toner image (e.g., stirring toner in the developing unit). In this case, where the determination result by the determination section is that the preliminary operation is executable, the preliminary operation on all the units that achieve respective functions including the developing unit as a management target unit is executed during transition to the standby mode according to input of an instruction by which no specific function is specified. By contrast, where the determination result by the determination section is that the preliminary operation is non-executable, the preliminary operation on the developing unit is not executed during transition to the standby mode according to input of an instruction by which no specific function is specified. After the instruction is input, the preliminary operation on the developing unit is executed at the time when an instruction to execute the main operation (formation of a toner image), such as a printing instruction is input.

According to the image processing device of the present disclosure, the user friendliness can be maintained as far as possible, and a defect, which may be caused due to execution of the preliminary operation not followed by the main operation, can be appropriately prevented. Thus, the present disclosure is useful for image processing devices.

The present disclosure is not limited in terms of the particular embodiments described in this application, which are intended as illustrations of various aspects. Many modifications and variations can be made without departing from the spirit and scope of the present disclosure, as will be apparent to those skilled in the art. Functionally equivalent apparatuses and methods within the scope of the disclosure, in addition to those enumerated herein, will be apparent to those skilled in the art from the foregoing descriptions. Such modifications and variations are intended to fall within the scope of the appended claims. With respect to any or all of the flowcharts in the drawings and as discussed herein, each block and/or communication may represent a process of information and/or a transmission of information in accordance with example embodiments, and alternative embodiments may be included within the scope of such example embodiments. Further, more or fewer blocks and/or functions may be used with any of the flow charts discussed herein, and these flow charts may be combined with one another, in part or in whole.

The invention claimed is:

1. An image processing device capable of executing a plurality of functions, comprising a CPU, wherein
the CPU implements a preliminary operation execution section, a determination section, and an operation control section,
the preliminary operation execution section allows a unit which achieves a function to execute preliminary operation for execution of main,
the main operation is an operation to achieve the function,
the preliminary operation is an operation that is executed independently of the main operation before the main operation and by which the function is not achieved independently,
the preliminary operation includes a preliminary operation followed by execution of the main operation and a preliminary operation not followed by execution of the main operation,
the determination section determines whether to allow the preliminary operation execution section to execute the preliminary operation on the basis of a degree of execution of the preliminary operation not followed by execution of the main operation, and
the operation control section allows, based upon a determination result by the determination section being that the preliminary operation is executable, the preliminary operation execution section to execute the preliminary operation upon input of an instruction not being specified to be followed by execution of the main operation, and inhibits, based upon a determination result by the determination section being that the preliminary operation is non-executable, the preliminary operation execution section from executing the preliminary operation upon input of an instruction having a possibility of not being followed by execution of the main operation,
when a total number of execution times of the preliminary operation not followed by execution of the main operation exceeds a predetermined threshold value, the determination section determines that the preliminary operation is non-executable, and
the predetermined threshold value is set based on image-formation quality in a situation in which the preliminary operation not followed by execution of the main operation is executed repeatedly.

2. The image processing device of claim 1, wherein
the CPU implements a power control section, and
the power control section switches a plurality of power supply modes including a standby mode, in which at least one of the functions is executable, and a low power consumption mode, in which power consumption is lower than that of the standby mode,
wherein the power control section switches the power supply modes from the low power consumption mode to the standby mode according to input of the instruction not being specified to be followed by execution of the main operation or the instruction having a possibility of not being followed by execution of the main operation.

3. The image processing device of claim 2, wherein
the at least one of the functions is selected from an image reading function, an image formation function, a facsimile function, and a network receiving/sending function.

4. The image processing device of claim 1, wherein
when the preliminary operation is followed by execution of the main operation, the determination section resets the total number of execution times.

5. The image processing device of claim 1, wherein
when an accumulated time period when a drive section driven in execution of the preliminary operation is driven after previous execution of main operation exceeds a predetermined threshold value, the determination section determines that the preliminary operation is non-executable.

6. The image processing device of claim 1, wherein
where the determination result by the determination section is that the preliminary operation is non-executable, the operation control section inhibits the preliminary operation section from executing the preliminary operation and allows the preliminary operation execution section to execute the preliminary operation when an instruction to execute the main operation is input.

7. The image processing device of claim 1, further comprising:
an image carrier configured to carry a toner image that is to be transferred to a transfer target; and
a developing unit configured to form a toner image onto the image carrier,
wherein the main operation is formation of a toner image onto the image carrier by the developing unit, and
the preliminary operation is at least one of preliminary operation on the developing unit and preliminary operation on the image carrier, for the formation of a toner image.

8. The image processing device of claim 7, wherein
the function is an image forming function, and
the preliminary operation on the developing unit includes rotation of a developing roller arranged to face the image carrier and rotation of a stirring roller to stir the toner in the developing unit, and each of the rotations accompanies no image formation.

9. The image processing device of claim 1, wherein
the predetermined threshold value is set based on a total number of execution times up to which degradation of image-formation quality may be caused where the preliminary operation not followed by execution of the main operation is executed repeatedly.

10. The image processing device of claim 9, wherein
the plurality of functions include a management target function and a non-management target function other than the management target function,
the function that is achieved by the unit is the management target function,
the image processing device further comprises a unit that achieves the non-management target function, and
where the determination result by the determination section is that the preliminary operation is non-executable, preliminary operation on the unit that achieves the non-management target function is executed without execution of the preliminary operation on the unit that achieves the management target function.

11. The image processing device of claim 10, wherein
in a situation in which an instruction to execute the management target function is input after execution of the preliminary operation on the unit that achieves the non-management target function where the determination result by the determination section is that the preliminary operation is non-executable, a value of the total number of execution times is reset.

12. The image processing device of claim 10, wherein
where the determination result by the determination section is that the preliminary operation is executable, the preliminary operation on the unit that achieves the management target operation is executed and the preliminary operation on the unit that achieves the non-management target function is executed.

13. The image processing device of claim 12, wherein
in response to input of an instruction to execute the management target function, the determination section resets a value of the total number of execution times, and
in response to input of an instruction to execute the non-management target function, the determination section does not reset the value of the total number of execution times.

* * * * *